June 3, 1958     O. J. VOSS ET AL     2,836,982
FRICTION DRIVE WHEEL
Filed May 18, 1956

INVENTORS
OTTO J. VOSS
LOREN WILLHOFT
By Baumgarten Sutherland
ATTORNEYS.

United States Patent Office 2,836,982
Patented June 3, 1958

2,836,982

FRICTION DRIVE WHEEL

Otto J. Voss, Town and Country, and Loren Willhoft, Frontenac, Mo., assignors to St. Louis Diecasting Corporation, St. Louis, Mo., a corporation of Missouri Application May 18, 1956, Serial No. 585,894

4 Claims. (Cl. 74—214)

This invention relates generally to laundry dryers and particularly to the driving and supporting wheels for the drum in a tumbling type dryer.

In the tumbling type of laundry dryer, it is customary to support the drum, or at least the front thereof, on spaced wheels which make peripheral contact with the exterior surface of the drum, or a rail thereon, in the lower quadrant thereof. In the usual practice, the wheel on one side is an idler wheel, while the wheel on the other side is a driven wheel. Driving motion imparted to the driven wheel is customarily transmitted to the drum to rotate the same about a horizontal axis either by gear teeth on the driven wheel intermeshing with companion teeth on the drum, or by frictional engagement between the drum and the surface of the driven wheel. In the latter type of drive, such wheels have heretofore been provided with tires of rubber or rubber-like material, or comparable friction surface materials. When these tires or friction surfaces have been of a character such as to maintain a tight grip on the rim of the wheel so as to inhibit relative circumferential movement therebetween, the character of the material from which they are made is inherently such as to develop flat places due to the dead weight of the drum resting upon a given position on the wheel while the dryer is idle as in storage. Of course, when, thereafter, the machine is operated, the presence of such flat places on the wheel militates against smooth and quiet operation of the device, and the continued pounding operation aggravates the situation.

The present invention contemplates an improvement upon the friction drive of such machines, and the object thereof, generally stated, is to provide a drive wheel and idler wheel for such drying apparatus in which all metallic parts of the wheel may be die-cast integrally, and in which a rubber-like tire may be vulcanized in situ in interlocking engagement with parts of the die casting.

A more specific object of the invention is to provide a wheel of the character described wherein the friction surface is securely anchored against circumferential movement relative to the metallic parts of the wheel, and wherein the tire is capable of resisting the formation of the aforesaid flat places during storage.

The present invention contemplates generally a drive or idler wheel of the character referred to in which the rim, the hub, and the spokes and/or web interconnecting the rim and hub are an integral die casting; and further that such die casting includes an integral, generally sinuous, band concentric with the rim and in spaced relationship outwardly thereof. The sinuous band last referred to is integrally connected at spaced, circumferential intervals with the rim of the wheel, but between the spaced connections open space is provided into and through which which the material of the friction surface may be flowed from opposite sides of the sinuous band and an integral loop thereof formed about the sinuous band in radial direction, as well as in the circumferential direction. The spaced connections between the rim and the concentric band of the wheel are preferably arranged so as to permit the withdrawal of fingers (which occupy the spaces between the connectors) on a two-piece molding die.

After the metallic part of the wheel has been die-cast, the invention contemplates that there be molded in situ about the rim, completely embedding the aforesaid band and extending both outwardly and inwardly of the same, a ring of thermoplastic material such as rubber, synthetic rubber, or any of various plastics which provide a good friction surface. This is accomplished by disposing the wheel as the core of a mold having companion parts which define the cavity to be occupied by the thermoplastic material; and then charging that cavity with the plastic material and applying pressure to the plastic material to conform it to the cavity defined by the mold parts and the wheel (as a core therein) under the required conditions of temperature and pressure, to cause the plastic material to flow around the sinuous band and embed itself in the spaces between the band and the rim of the wheel.

In the accompanying drawings, one embodiment of the invention is illustrated:

Figure 1:
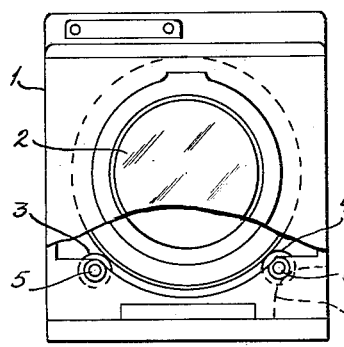
Figure 1 is a view in front elevation, with a portion broken away to reveal the relationship of the parts, of a laundry dryer provided with drive and idler wheels constructed in accordance with the present invention.

A laundry dryer of the character referred to consists of a suitable enclosure 1 surrounding a drum 2 into which the laundry to be dried is placed and tumbled, together with suitable heating and air circulating means not shown. The drum 2 is arranged for rotation about a horizontal axis, and is supported at the front thereof by an idler wheel 3 and a driven wheel 4. In the embodiment shown in the drawings, the idler wheel 3 is intended to be free-running upon a shaft 5, and consequently its hub is provided with a suitable bearing such as a sintered bronze bearing. On the contrary, the drive wheel 4 is, in the embodiment shown, fixed on its shaft 6 in any suitable way such as by the provision of a set screw therein. Save for the fact that the idler wheel is provided with a bearing at its hub, and the fact that the drive wheel 4 is provided with some means for securing it to the shaft, the metallic structure of the two wheels is identical. Indeed, the metallic structure of the two wheels may be completely identical in cases where it is desired to mount the shaft 5 in suitable bearings so that idler wheel 3 is fixed to that shaft for rotation therewith.

Any suitable source of power 7 may be provided for imparting rotary motion to drive wheel 4 on shaft 6.

Figure 2:
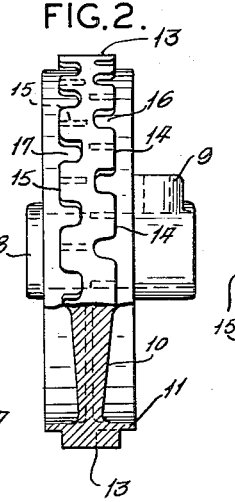
Figure 2 is a view in side elevation of the die-cast metallic component of the drive or idler wheel shown in Figure 1.
Figure 3:
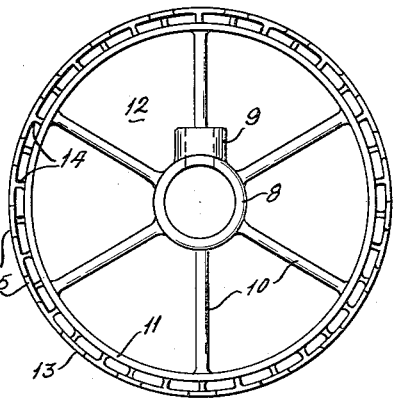
Figure 3 is a view in front elevation of the wheel shown in Figure 2.

As shown in Figures 2 and 3, the metallic part of the drive wheel 4 consists of a central hub 8, having a boss 9 for the reception of a set screw, integrally connected through spokes 10 with a rim 11. Preferably, a web of metal 12 bridges the space between the respective spokes 10, the hub 8, and the rim 11, such web being relatively thin in the axial direction of the wheel. In radially spaced relationship outward of rim 11, a sinuous band 13 is provided and integrally connected through a series of circumferentially spaced ribs 14 and 15 with the rim 11.

As clearly shown in Figure 2, the ribs 14 and 15 extend axially for less than the axial dimension of the sinuous band 13 at the sections where those ribs are respectively located; and the ribs 14 and 15 are arranged in staggered relationship so that ribs 15 are aligned with valleys 16 on the right edge (as seen in Figure 2) of the sinuous bad 13, while the ribs 14 are aligned with valleys 17 on the left edge of the sinuous band. Substantial space is allowed between band 13 and rim 11, and between adjacent ribs 14 and 15, in order to permit the friction surface material, later to be applied, to flow beneath band 13, embedding ribs 14 and 15 and completely surrounding band 13 in the process of being molded in situ upon the wheel.

Figure 4:
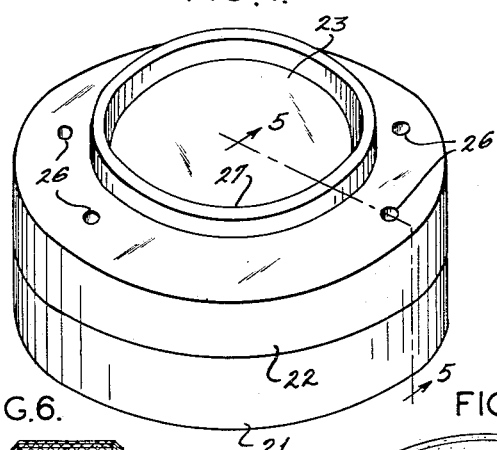
Figure 4 is a perspective view of a mold suitable for conforming the tire or friction material about the rim of the wheel.
Figure 5:
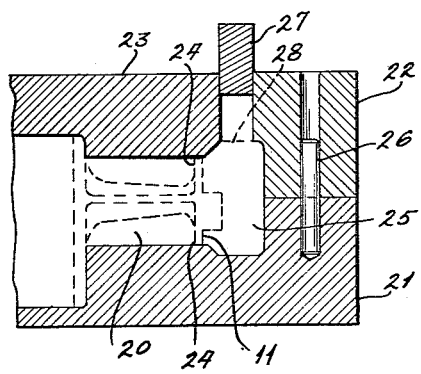
Figure 5 is a sectional view taken along line 5—5 of Figure 4.

In the application of the friction surface to the wheel just described, the wheel may be used as the core in a mold such as that shown in Figures 4 and 5. In Figure 5, the wheel is shown in dotted lines within the cavity 20 defined by mold parts 21, 22, and 23. As clearly shown in Figure 5, the mold parts 21 and 23 engage rim 11 of the wheel, as shown at 24. Such engagement is peripherally continuous, and consequently the rim 11 provides a core wall within cavity 20 of the mold so as to separate that cavity into wholly separate spaces radially inward and radially outward, respectively, of rim 11. The radially outward space 25 is shaped and proportioned so as to correspond with the exterior surface of the tire or friction material to be formed on the wheel, with the exception, however, of the surface thereof at the mouth of cavity 25 which is shaped by another member later to be described.

The cavity 20 formed between mold parts 21 and 23 is shaped to receive the hub 8 of the wheel, and hence hold the wheel in fixed position relative to the mold parts while the wheel is being used as a core therein. While mold parts 21 and 23 are maintained in appropriate alignment by interengagement respectively with opposite ends of the hub of the wheel, mold parts 21 and 22 are maintained in proper alignment by a series of suitable keys such as 26.

With the mold parts 21, 22, and 23 in position about the wheel, as shown in Figure 5, there is a space between mold parts 22 and 23 which provides a mouth for space 25, and such mouth is circumferentially continuous. Through this mouth, the space 25 may be charged with the material of which the friction surface is to be formed. When the appropriate amount of such material has been charged into space 25, a ring 27 is inserted, and when the material in space 25 has been made flowable, as by the application of heat, pressure is applied to ring 27 forcing the same downwardly into space 25 until the lower edge of ring 27 is in its final position 28 (shown in dotted lines in Figure 5 at which it defines the final surface of the friction material at the space between mold parts 22 and 23.

Figure 6:
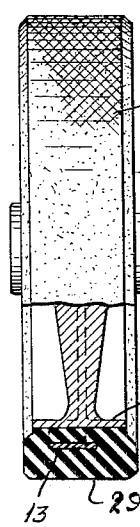
Figure 6 is a view in side elevation of the completed wheel.
Figure 7:
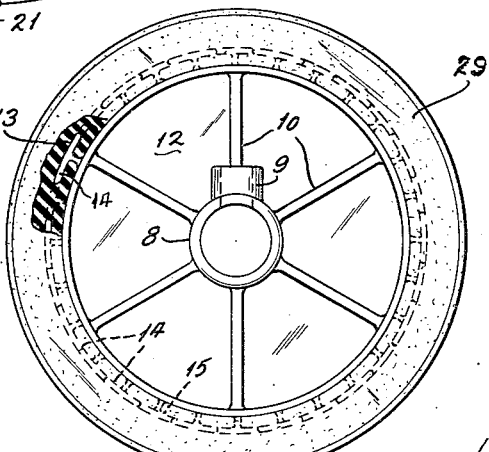
Figure 7 is a view in front elevation of the completed wheel.

The completed wheel is shown in Figure 6, from which it will be observed that the friction surface material 28 has, in the process of being molded in situ about band 13, been caused to flow between said band and rim 11 so that the band 13 and its ribs 14 and 15 are completely embedded in the material 29, and a continuous integral loop of the material 29 encircles the band 13 both circumferentially and radially. The interlocking of the material 29 about the band 13 and the ribs 14 and 15 thus prevents the friction material from creeping circumferentially with reference to the rim 11, and prevents the friction material from being removed from the rim 11.

The material of which the friction surface 29 may be made may be any of those previously indicated, it being preferable that the material be so chosen that it will not permanently deform under the static load of the drum 2. For example, the friction surface member 29 may be made of synthetic rubber of the butadiene-styrene copolymer type, such as one known as "Government Reserve Styrene." When the space 25 is charged with the appropriate amount of such rubber stock, the temperature of the mold and contents is first elevated to a point such that the rubber stock becomes mushy. Thereupon, pressure is applied to ring 27, forcing the same down into its final position and vulcanizing the rubber while the mold parts are in their final position. A temperature of 325° F. at a pressure of two to three tons is adequate to accomplish the desired interlocking of the rubber behind band 13 and the vulcanization of the same in situ upon the band. Rubber stock of the character referred to of from 50 to 55 durometer provides a friction surface which does not permanently deform under the static load of the dryer drum.

If desired, the peripheral surface of material 29 on the respective wheels may be knurled.

From the foregoing description, those skilled in the art should readily understand that the invention accomplishes its objects and provides a wheel of the character described, suitable for the purpose described, which may be manufactured with facility and economy, and without requiring any machining operation on any part thereof, with the sole exception of threading the boss 9 for the reception of a set screw. The embedding of the friction surface material about the sinuous band 13, and the ribs supporting the same in spaced relationship from rim 11, securely anchors the friction surface material against relative movement in any direction without unbalancing the structure.

While one complete embodiment of the invention has been disclosed in detail, it is not to be understood that the invention is limited to that embodiment. On the contrary, it is to be understood that various modifications and adaptations of the invention may be made without departing from the spirit of the invention or the scope of the appended claims.

Having thus described the invention, what is claimed and desired to be secured by Letters Patent is:

1. A friction drive wheel comprising a die casting having a rim, a continuous sinuous band concentric with said rim but radially spaced outwardly therefrom, said band being integrally connected with said rim by a plurality of spaced ribs whose walls are substantially parallel with the radii on which they are located respectively, and a rubber-like tread on said rim embedding said band and said ribs.

2. The improvement of claim 1 wherein said tread is molded in situ on said rim and about said band and ribs.

3. A die cast wheel structure having a hub, a rim integrally connected with the hub, a continuous sinuous band concentric with said rim and spaced therefrom, and circumferentially spaced ribs integrally connecting said rim and said band.

4. The wheel of claim 3 wherein said ribs extend axially of the wheel at the crests of said sinuous band alternately from opposite edges thereof.

References Cited in the file of this patent

UNITED STATES PATENTS

| | | |
|---|---|---|
| 2,273,283 | Pfeiffer | Feb. 17, 1942 |
| 2,673,470 | Cosmos | Mar. 30, 1954 |

FOREIGN PATENTS

| | | |
|---|---|---|
| 1,044,046 | France | Nov. 13, 1953 |

UNITED STATES PATENT OFFICE

CERTIFICATE OF CORRECTION

Patent No. 2,836,982                                                              June 3, 1958

Otto J. Voss et al.

It is hereby certified that error appears in the printed specification of the above numbered patent requiring correction and that the said Letters Patent should read as corrected below.

Column 1, line 42, after "pounding" insert -- during --; line 61, for "includes" read -- include --; line 69, after "in" insert -- the --.

Signed and sealed this 12th day of August 1958.

(SEAL)

Attest:
KARL H. AXLINE

Attesting Officer

ROBERT C. WATSON
                                                      Commissioner of Patents